June 19, 1956

F. C. BOWMAN ET AL 2,751,357

WATER SOFTENING AND DETERGENT COMPOSITION
AND PROCESS OF PREPARING SAME

Filed Feb. 26, 1951

FREDERIC CHARLES BOWMAN
WILLIAM MAXWELL RAMSEY
INVENTORS

BY Lyon & Lyon

ATTORNEYS

United States Patent Office 2,751,357
Patented June 19, 1956

2,751,357

WATER SOFTENING AND DETERGENT COMPOSITION AND PROCESS OF PREPARING SAME

Frederic Charles Bowman and William Maxwell Ramsey, South Gate, Calif., assignors to Victor Chemical Works, Chicago, Ill., a corporation of Illinois Application February 26, 1951, Serial No. 212,810

5 Claims. (Cl. 252—135)

This invention relates to water softening and detergent composition and to a process of preparing the same in variable proportions in a single operation, and relates more particularly to a water softening and detergent composition comprising anhydrous trisodium phosphate, tetrasodium pyrophosphate, and sodium carbonate, and to a process of preparing such a composition in variable and reasonably controllable proportions from phosphoric acid and sodium carbonate or the chemical equivalents.

One of the principal objects of our invention is to provide water softener and detergent compositions comprising anhydrous trisodium phosphate, anhydrous tetrasodium pyrophosphate, and anhydrous sodium carbonate, which compositions have properties superior to ordinary mechanical mixtures of the same compounds.

Another object of our invention is to provide water softener and detergent compositions in the form of discrete particles ranging in size from powder to coarse granules, each particle containing anhydrous trisodium phosphate, anhydrous tetrasodium pyrophosphate, and anhydrous sodium carbonate, intimately bonded together.

The products of our invention are well suited for use as water softeners or detergents for various industrial and domestic purposes such as laundry, dish washing, household cleaning, softening of bath water, mixture with soaps or soap powders, for the removal of grease from concrete, tile, or machinery, and other general cleaning purposes.

Heretofore, sodium phosphates have been separately produced. In the production of trisodium phosphate a mixture of disodium phosphate in solution is heated with an equivalent of soda ash for a prolonged period of time at a temperature above a red heat (the British Patent No. 2,028 of August 1, 1871, to John Thomas Way). From this early disclosure of the method of production of trisodium phosphate the art has proceeded to develop the production of numerous phosphates of soda using processes which require heat treatment to the point of fusion followed with, in many cases, rapid chilling of the product. In other cases sodium hydroxide must be used to maintain the stoichiometric ratio of $Na_2O:P_2O_5$ above 2.0.

The process of our invention is characterized by the facts that compositions comprising anhydrous trisodium phosphate ($Na_3PO_4$), anhydrous tetrasodium pyrophosphate ($Na_4P_2O_7$), and anhydrous sodium carbonate ($Na_2CO_3$) are prepared from phosphoric acid and sodium carbonate, or their chemical equivalents, requiring no relatively expensive sodium hydroxide to be used, and where the temperature of the furnaced material is conducted below a red heat so that the product is not fused, glassy or melted, and is a rather light, porous and readily soluble mixture or compound. Our product is further characterized in that the stoichiometric ratio of $Na_2O:P_2O_5$ is not less than 2 and not more than 5.1.

Our process is further characterized in that by controlling the ratio of $Na_2O:P_2O_5$ within the range above specified and maintaining the times and temperatures deliberately inadequate for complete reaction in some cases and controlling the rate of feed to determine the amount of charge held in the furnace, we are able reasonably to control the proportions of the anhydrous trisodium phosphate, anhydrous tetrasodium pyrophosphate, and sodium carbonate in the resultant product and are able to produce products which have properties superior to those of an ordinary mechanical mixture of the same compounds.

The advantage of such a mixed product for cleaning purposes is that trisodium phosphate is a very efficient water softener and detergent, and while the tetrasodium pyrophosphate is not as good a detergent per se, it has the ability in such a mixture to peptize the insolubles and dirt as well as the chemicals producing the water hardness; and the resultant product is more effective as a cleansing agent than simple mixtures, and may be more inexpensively produced than is possible by the independent production of the separate ingredients.

Another object of our invention is to provide a process for producing a water softening or detergent compound or mixture which includes the simultaneous furnacing of a water solution of phosphoric acid and sodium carbonate at a temperature below a red heat and below the point at which the product is fused or melted and wherein the stoichiometric ratio of $Na_2O:P_2O_5$ is not less than 2 and not more than 5.1.

Mixtures containing anhydrous tetrasodium pyrophosphate, anhydrous trisodium phosphate and anhydrous sodium carbonate for cleansing, detergent or water softening use have been known for a good many years; these ordinary mechanical mixtures are good detergents and water softeners, but they have certain disadvantages. It is necessary to install mixing equipment and spend labor to produce the mixtures from the separate ingredients; the ingredient containers often are deteriorated or destroyed, which causes further economic loss. If the simple mixtures are granular in physical form, the ingredients dissolve rather slowly as an entity, and do not dissolve at a uniform rate. Since the ingredient anhydrous salts in simple mechanical mixtures have different densities and particle sizes, they may segregate appreciably, so that the first part of a container's contents used may not have the same composition or effect as the last portion.

The present compositions provide powder, granular or coarse-granular particles consisting of an intimate mixture of anhydrous tetrasodium pyrophosphate ($Na_4P_2O_7$), anhydrous trisodium phosphate ($Na_3PO_4$) and anhydrous sodium carbonate ($Na_2CO_3$), wherein substantially every particle contains all three of the three anhydrous ingredients, as indicated by the test results described hereinafter. The ingredients are inherently bonded together within the particle so that they cannot be separated by ordinary mechanical means.

Compositions in accordance with our invention dissolve very considerably faster in cool, warm or even hot water than do mere mechanical mixtures having the same proportions of ingredients.

Our compositions do not segregate into separate ingredient particles on tapping, shaking or handling. The last portion used from a package of a composition embodying our invention has substantially the same composition as the first portion withdrawn. Moreover, the composition is practically independent of particle size so that segregation by sifting is also avoided in our products. Segregation is particularly to be avoided where one or two of the three chemical ingredients are present in small amount.

As is not true of simple mechanical mixtures, our compositions dissolve in water uniformly, that is, in such a manner that the first portion dissolved has substantially the same composition as the last portion to dissolve.

Other objects and advantages of this invention it is believed will be apparent from the following detailed description as the same is set forth in conjunction with the accompanying drawings.

Figure 1:
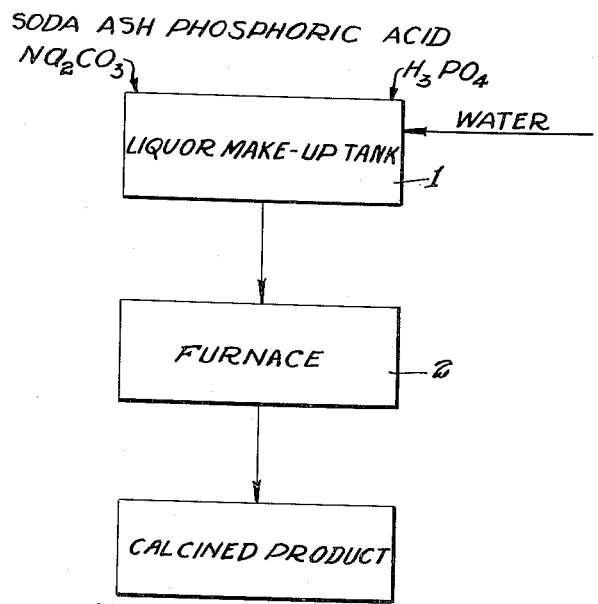
Figure 1 is a flow diagram.

In carrying out our invention in its preferred form sodium carbonate $Na_2CO_3$ (soda ash) is mixed with water and phosphoric acid in the liquor make-up tank 1 where it is stirred to give as strong a solution as can conveniently be handled and in the proportions to give the desired $Na_2O:P_2O_5$ ratio. The feed liquor thus prepared has a specific gravity of approximately 1.5 but this is not critical. The mixing in the tank 1 raises the temperature of the solution due to the heat of reaction giving a high enough temperature, ordinarily in the neighborhood of 80° C. to maintain a high solubility giving a good strength of the feed liquor. Additional heating is sometimes convenient. Excessive water is avoided because of the fact that such excess of water would slow the operation of the calcining furnace 2. The feed liquor thus prepared is fed, preferably continuously, to the nearly horizontal rotary internally fired calcining furnace 2 of any standard type. The liquor is so fed that it will spread on a rolling bed of the product and advance to the discharge end of the furnace.

The rate of feed is controlled so that the charge is held in the furnace from between one to two hours, although this is not critical, as will be pointed out below. The inclination of the furnace 2 upon its bearings 3 determines the amount of charge that will be held in the furnace during calcining.

The furnace 2 is, as previously stated, of the internally fired type and the fire gases 5 enter the furnace 2 and travel through the furnace. The feed liquor enters the furnace through one or more pipes 4 and is distributed on the bed of the calcine in such a manner or at such a rate so that large lumps, rings, or wet zones are not formed. We preferably avoid spraying of the feed liquor into the furnace as such spraying causes serious dust losses.

Figure 2:
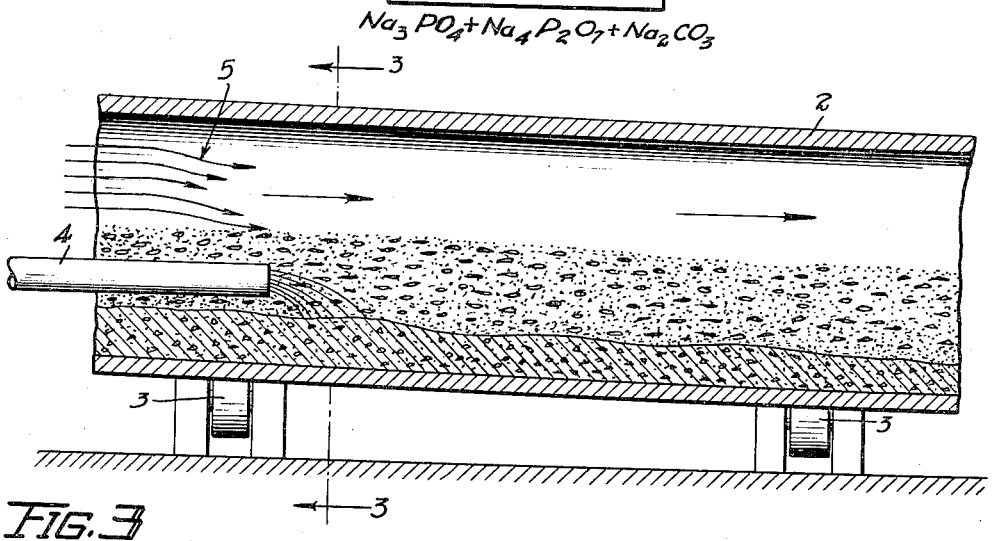
Figure 2 is a diagrammatic sectional view of a furnace used in carrying out the process of our invention.
Figure 3:
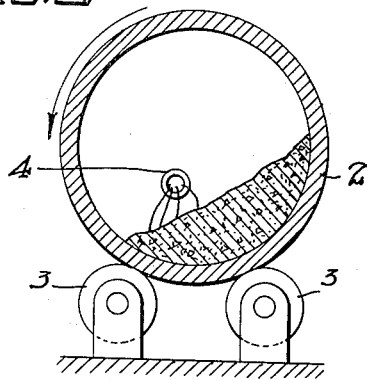
Figure 3 is an end sectional view thereof taken substantially on the line 3—3 of Figure 2.

The feed liquor need not pass directly through the flame or dry completely before it reaches the bed of calcine. Instant drying in the flame is not necessary and is avoided for the same reason as spraying as it is liable to induce serious dust losses. As illustrated in Figure 2 of the drawing, the dry calcine travels slowly from the feed liquor inlet to the exit end of the kiln being given a rolling and tumbling motion by slow rotation of the kiln.

The temperature of operation, as well as the time, is not critical and ranges from 250 to 550° C., both temperature and time depending upon the design of the kiln as well as upon the nature and conditions of the process. The temperature is measured by a pyrometer immersed in the charge (near the discharge end). The temperature is maintained at all times below that which would produce in the calcine a red heat or fusion or melting of the charge with the result that a coarse powder or small lumps are formed which are white, friable and readily soluble in water. We avoid fusion and eliminate the production of sodium metaphosphates, sodium tetraphosphates, sodium tripolyphosphates and anhydrous disodium phosphate or any of the fused or glassy phosphate compositions.

To illustrate the controllability of our process to produce the desired mixtures or compositions of trisodium phosphate and tetrasodium pyrophosphate, the following table is given:

*Feed liquor*

| Ratio $Na_2O:P_2O_5$ | 2.00 | 2.46 | 2.76 | 3.00 | 4.00 | 4.00 | 5.08 | 5.08 |
|---|---|---|---|---|---|---|---|---|
| Bé. at 80° C | 49.0 | 49.3 | 47.9 | 48.2 | 43.0 | 43.0 | 40.0 | 40.0 |
| Temp. of furnace °C | 410 | 250 | 370 | 390 | 380 | 470 | 400 | 550 |
| Time in furnace, hours | 1½ | 1½ | 1½ | 1½ | 1½ | 1½ | 1½ | 1½ |

*Analysis of product*

| Percent $Na_3PO_4$ | 4.0 | 64.2 | 76.5 | 91.0 | 43.1 | 57.0 | 40.1 | 56.3 |
|---|---|---|---|---|---|---|---|---|
| $Na_4P_2O_7$ | 96.0 | 33.7 | 19.7 | 2.0 | 23.65 | 13.35 | 13.75 | 2.4 |
| $Na_2CO_3$ | trace | 2.5 | 4.6 | 6.5 | 33.2 | 28.6 | 46.1 | 42.7 |
| Total $P_2O_5$ | 52.7 | 45.8 | 43.8 | 40.5 | 31.3 | 31.85 | 24.7 | 25.7 |

This table is compiled as a result of determinations heretofore made to determine the controllability of our process as to the formation of anhydrous trisodium phosphate simultaneously with the formation of anhydrous tetrasodium pyrophosphate and anhydrous $Na_2CO_3$ enabling us to thereby choose the conditions of operation as well as ratio of $Na_2O:P_2O_5$ requisite to produce the desired mixture.

A preferred physical size of our compositions is a visibly particulate material, and such particles dissolve in water appreciably faster than simple mechanical mixtures of the same screen sizing. Fast solution rate is a generally advantageous characteristic, and is particularly important where detergents are made up into solution and used in cycles lasting only a few minutes. The advantageous solution rates of our products are shown in the following tables. In these tests the time in seconds required to effect solution of a 30 gram sample in 1500 ml. water under moderate and constant agitation is recorded; "I" indicates the compositions embodying our invention while "M" denotes a simple mechanical mixture. Closely sized particles all passing a standard U. S. No. 16 sieve and retained on a U. S. No. 20 sieve were used in all cases, unless otherwise noted.

*Table I*

[Tests at 20° C.]

| Composition: | | | | | | | | |
|---|---|---|---|---|---|---|---|---|
| Percent $Na_4P_2O_7$, anh | 53.7 | | 21.3 | | 1.5 | | 1.0 | |
| Percent $Na_3PO_4$, anh | 44.0 | | 74.6 | | 95.1 | | 91.8 | |
| Percent $Na_2CO_3$, anh | 1.7 | | 3.1 | | 3.0 | | 6.6 | |
| Mixture Type | I | M | I | M | I | M | I | M |
| Solution Time, sec | 300 | 365 | 205 | 350 | 180 | 255 | 185 | 225 |

*Table II*

[Tests at 30° C.]

| Composition: | | | | |
|---|---|---|---|---|
| Percent $Na_4P_2O_7$, anh | 53.7 | | 1.5 | |
| Percent $Na_3PO_4$, anh | 44.0 | | 95.1 | |
| Percent $Na_2CO_3$, anh | 1.7 | | 3.0 | |
| Mixture Type | I | M | I | M |
| Solution Time, sec | 155 | 195 | 100 | 145 |

*Table III*

[Tests at 40° C.]

| Composition: | | | | | | | | |
|---|---|---|---|---|---|---|---|---|
| Percent $Na_4P_2O_7$, anh | 53.7 | | 21.3 | | 1.5 | | 1.5 | |
| Percent $Na_3PO_4$, anh | 44.0 | | 74.6 | | 95.1 | | 68.1 | |
| Percent $Na_2CO_3$, anh | 1.7 | | 3.1 | | 3.0 | | 30.8 | |
| Mixture Type | I | M | I | M | I | M | I | M |
| Solution Time, sec | 95 | 115 | 80 | 110 | 60 | 80 | 60 | 90 |

The faster solution rate of the inherent mixtures is even quite noticeable at higher temperatures. Again for materials passed by a U. S. No. 16 sieve and retained by a U. S. No. 20 sieve, and for a composition of 53.7% $Na_4P_2O_7$, 44.0% $Na_3PO_4$ and 1.7% $Na_2CO_3$ we find solution times as follows:

Table IV

| Temperature of Solution (° C.) | 50 | 60 |
|---|---|---|
| Solution Time (seconds): | | |
| 1. Our Product | 50 | 35 |
| 2. Simple mechanical mixture | 65 | 45 |

With coarser or finer particle sizes the solution rate difference intrinsic between our products and mere mechanical mixtures still appears as shown below; the time differences being dependent on particle size, as well as agitation conditions, and temperature of the solution.

Table V

Composition of mixture:
53.7% $Na_4P_2O_7$
44.0% $Na_3PO_4$
1.7% $Na_2CO_3$

[A. Particle sizing: All through U. S. No. 10 and retained on U. S. No. 16 sieves.]

| Temperature of Solution | 20° C. | | 30° C. | |
|---|---|---|---|---|
| Type of Mixture | I | M | I | M |
| Solution Time, seconds | 475 | 600 | 240 | 330 |

[B. Particle sizing: All through U. S. No. 20 and retained on U. S. No. 40 sieves.]

| Temperature of Solution | 20° C. | | 30° C. | |
|---|---|---|---|---|
| Type of Mixture | I | M | I | M |
| Solution Time, seconds | 185 | 250 | 80 | 120 |

Table Va

[Test at 20° C. Through U. S. No. 10, retained on U. S. No. 16.]

| Composition: | |
|---|---|
| Percent $Na_4P_2O_7$, anh | 92.7 |
| Percent $Na_3PO_4$, anh | 5.5 |
| Percent $Na_2CO_3$, anh | 0.9 |

| Mixture Type | I | M |
|---|---|---|
| Solution Time, sec | 625 | 765 |

With material containing major amounts of anhydrous sodium carbonate, the comparative solution rate of our product is also particularly improved over mechanical mixtures, as follows:

Composition: 12.5% $Na_4P_2O_7$, 51.6% $Na_3PO_4$, 36.7% $Na_2CO_3$

Sieve Particle Sizing: Through U. S. No. 16, retained on U. S. No. 40.

Solution Time, seconds, at 30° C.:
 a. Our product _____ 80
 b. Simple mixture _____ 185

For another composition (27.4% $Na_4P_2O_7$, 33.0% $Na_3PO_4$ and 40.1% $Na_2CO_3$, passed by U. S. No. 10 and retained by U. S. No. 40 sieves) the comparative solution times at 30° C. are:

|  | Seconds |
|---|---|
| a. Our product | 180 |
| b. Simple mixture | 330 |

A further advantage of our product is the substantial constancy of the relative solution composition during the process of dissolving. With simple mixtures made up of particles not containing all three constituent compounds the separate compounds will dissolve at different rates and the relative amount of each compound in solution varies during the dissolving process. Our product, however, dissolves all of its constituents at a substantially constant rate. If sensitive fabrics, metals or other materials are in contact with the water softening or detergent solution during its make-up, or if the solution is made up continuously or continually this is a particular advantage of our product.

This advantage can be illustrated by measuring the relative alkalinity to phenolphthalein and methyl orange indicators of the soluble but undissolved residue and the solution after partially dissolving the mixture. The alkalinity is measured by the volumes, in milliliters, of normal hydrochloric acid (N.HCl) required first to neutralize the solution to phenolphthalein indicator end point and then to further neutralize from phenolphthalein indicator to methyl orange indicator end points respectively. By way of explanation, anhydrous tetrasodium pyrophosphate shows a very low alkalinity to phenolphthalein compared to anhydrous trisodium phosphate and anyhydrous sodium carbonate. Further, the ratio of the two alkalinities (alkalinity ratio is taken as the alkalinity titration from phenolphthalein end point to methyl orange indicator end point divided into the alkalinity titration to phenolphthalein indicator end point) will be substantially constant if the compound dissolves uniformly, and will be far from constant if the ingredients fail to dissolve at a constant proportional rate. The following tests were conducted at room temperature with 10 gram samples, the solvent being water.

Table VI

[Particle sieve sizing: Through U. S. No. 16, retained on U. S. No. 20.]

| Composition (Percent) | Type | Fraction Tested | Alkalinity, Ml.HCl | | Alkalinity Ratio (1./2.) |
|---|---|---|---|---|---|
| | | | 1. To Phth. | 2. Phth. To Methyl Orange | |
| 53.7 $Na_4P_2O_7$ | I | Solution | 16.9 | 38.9 | 0.434 |
| 44.0 $Na_3PO_4$ | | Residue | 12.1 | 28.6 | 0.423 |
| 1.7 $Na_2CO_3$ | M | Solution | 13.15 | 24.5 | 0.537 |
| | | Residue | 16.4 | 43.0 | 0.381 |
| 21.3 $Na_4P_2O_7$ | I | Solution | 28.3 | 37.8 | 0.749 |
| 74.6 $Na_3PO_4$ | | Residue | 20.0 | 26.5 | 0.755 |
| 3.1 $Na_2CO_3$ | M | Solution | 20.75 | 26.15 | 0.794 |
| | | Residue | 26.85 | 38.5 | 0.697 |
| 20.0 $Na_4P_2O_7$ | I | Solution | 25.6 | 33.3 | 0.769 |
| 77.9 $Na_3PO_4$ | | Residue | 23.7 | 30.9 | 0.767 |
| 2.0 $Na_2CO_3$ | M | Solution | 21.1 | 31.6 | 0.824 |
| | | Residue | 27.1 | 32.9 | 0.668 |
| 92.7 $Na_4P_2O_7$ | I | Solution | 2.70 | 22.9 | 0.118 |
| 5.5 $Na_3PO_4$ | | Residue | 4.70 | 47.4 | 0.10 |
| 0.9 $Na_2CO_3$ | M | Solution | 3.95 | 3.75 | 0.176 |
| | | Residue | 22.4 | 47.5 | 0.079 |
| 1.5 $Na_4P_2O_7$ | I | Solution | 34.9 | 39.15 | 0.891 |
| 68.1 $Na_3PO_4$ | | Residue | 31.3 | 35.2 | 0.889 |
| 30.8 $Na_2CO_3$ | M | Solution | 32.0 | 38.3 | 0.835 |
| | | Residue | 32.2 | 35.2 | 0.915 |

Table VII

[Particle sieve sizing: Through U. S. No. 10, retained on U. S. No. 16.]

| Composition (Percent) | Type | Fraction Tested | Alkalinity, Ml.HCl | | Alkalinity Ratio (1./2.) |
|---|---|---|---|---|---|
| | | | 1. To Phth. | 2. Phth. To Methyl Orange | |
| 53.7 $Na_4P_2O_7$ | I | Solution | 14.8 | 32.4 | 0.457 |
| 44.0 $Na_3PO_4$ | | Residue | 14.5 | 34.5 | 0.420 |
| 1.7 $Na_2CO_3$ | M | Solution | 20.5 | 38.3 | 0.535 |
| | | Residue | 9.2 | 28.7 | 0.320 |

Tables VI and VII show that our product (I) has dissolved uniformly, while the usual mechanical mixtures (M) disproportionate during the process of dissolving in water.

Where the mixture is very high in $Na_3PO_4$ anh., the alkalinity ratio of the partial solution tests as shown above is not a delicate measure of constancy of relative solution composition during the solution process. With such material, it is convenient to use another measure, namely the weight ratio of $Na_2CO_3/P_2O_5$ in the solution and in the undissolved residue, respectively.

When 10 gram samples of our product and of a mechanical mixture of the same over-all composition are partially dissolved in 250 ml. cool water and the respective solutions and residues analyzed, for carbonate (as $Na_2CO_3$) and phosphate (as $P_2O_5$), the great disproportionation of the simple mechanical mixture (M) is apparent; our product (I) shows only a slight difference between solution and residue $Na_2CO_3/P_2O_5$ weight ratios.

|  | A | | | | B | | | |
|---|---|---|---|---|---|---|---|---|
| Composition: | | | | | | | | |
| Percent $Na_4P_2O_7$ | 1.0 | | | | 1.55 | | | |
| Percent $Na_3PO_4$ | 91.8 | | | | 95.1 | | | |
| Percent $Na_2CO_3$ | 6.6 | | | | 3.0 | | | |
| Fraction Tested | Solution | | Residue | | Solution | | Residue | |
| Type of Product | I | M | I | M | I | M | I | M |
| $Na_2CO_3/P_2O_5$ Weight Ratio [1] | 0.125 | 0.340 | 0.149 | 0.036 | 0.051 | 0.090 | 0.071 | 0.018 |

[1] Weights (grams) $Na_2CO_3$, anh. per weight (gram) phosphate as $P_2O_5$.

One of the most important characteristics of our novel product is the non-segregating behavior of the material. In ordinary mixtures when the particle size of each ingredient differs, the finer-sized constituents tend to sift out of the main mixture body. Any particular one of our products has substantially the same composition irrespective of particle size. One of our coarse products when ground to a mixture of granules and powder and separated into sieve fractions of various particle sizings gave the following alkalinity ratios, calculated as indicated above:

| Sample Particle Sizing | | Alkalinity Ratio |
|---|---|---|
| Passed by U. S. Sieve No. | Retained on U. S. Sieve No. | |
| 10 | 16 | 0.435 |
| 40 | 60 | 0.429 |
| 60 | 100 | 0.430 |
| 100 | 200 | 0.427 |
| 200 | ------ | 0.432 |

This essential constancy of alkalinity as particle size varies would not be obtainable with ordinary mixtures where particle size varied markedly from ingredient to ingredient. These tests also show there is no substantial segregation of the three constituent salts when our product is broken up to various sized particles. This product contained 53.7% $Na_4P_2O_7$, 44.0% $Na_3PO_4$ and 1.7% $Na_2CO_3$.

To illustrate the sifting out or segregation of a usual, simple mechanical mixture, where ingredient particle size varies, we shook a simple mechanical mixture of the same average composition 100 times in a 16 mm. tube and separated it into three portions. The results show definite segregation (from top to bottom) of the mechanical mixture:

*Table VIII*

| Ingredient | $Na_4P_2O_7$ | $Na_3PO_4$ | $Na_2CO_3$ |
|---|---|---|---|
| Average Percent of Ingredient | 53.7 | 44.0 | 1.7 |
| Ingredient Particle Sizing (U. S. sieve Nos.): | | | |
| Test A | −10 +16 | −20 +40 | −16 +20 |
| Test B | −16 +20 | −20 +40 | −16 +20 |
| Portion of Shaken Mixture | Top | Middle | Bottom |
| Alkalinity Ratio: | | | |
| Test A | 0.600 | 0.392 | 0.389 |
| Test B | 0.480 | 0.372 | 0.412 |

The segregation of a mechanical mixture may be readily compared with the non-segregating behavior of our product by analyzing separate portions of a shaken mixture for $Na_2CO_3$, as illustrated in Table IX below.

*Table IX*

A. SEGREGATION TEST ON MECHANICAL MIXTURE

| Ingredient | $Na_4P_2O_7$ | $Na_3PO_4$ | $Na_2CO_3$ |
|---|---|---|---|
| Average Percent of Ingredient | 1.5 | 68.1 | 30.8 |
| Ingredient Particle Sizing: | | | |
| through U. S. Sieve No. | 16 | 30 | 16 |
| retained on U. S. Sieve No. | 20 | 40 | 20 |
| Portion of Shaken Mixture | Top | Middle | Bottom |
| Percent $Na_2CO_3$ in Portion | 18.8 | 38.0 | 49.9 |

Test conditions: 20.0 grams of mixed sample shaken 100 times in a 16 mm. inside diameter tube. 1.000 gram sample from each portion (top, middle, bottom) analyzed for $Na_2CO_3$, thereafter.

B. SEGREGATION TEST ON OUR PRODUCT

The over-all composition is the same as for the mechanical mixture above, namely:

| | Per cent |
|---|---|
| $Na_4P_2O_7$ | 1.5 |
| $Na_3PO_4$ | 68.1 |
| $Na_2CO_3$ | 30.8 |

Particle sizings of our product were selected to have the same relative distribution between U. S. sieve Nos. 16, 20, 30, 40 as for the mechanical mixture. The inherent mixture is shaken in the same way:

| Portion of Shaken Inherent Mixture | Top | Middle | Bottom |
|---|---|---|---|
| Percent $Na_2CO_3$ in Portion | 30.3 | 30.3 | 30.3 |

Our products can be analytically differentiated from ordinary mixtures with solutions of certain acidity-alkalinity indicators. We have used 0.05–0.5% alcoholic solutions of alpha-naphtholbenzein or thymolphthalein and 0.05% aqueous solution of malachite green for this differentiation. The test is conducted as follows: A glass or white paper surface is covered with a film of indicator solution and then granules of the mixture are sparsely distributed on the solvent-moist surface. (If lumps of ¾ inch to ¹⁄₁₆ inch size are being tested the indicator solution may be applied directly to the individual particle.) The particles are then observed for color. With our products the particles show substantially the same indicator color or tint. With usual mechanical mixtures the particles show high contrast in the color developed; this color difference is due to the varying alkalinities of the individual ingredient compounds in the simple mixture. This test succeeds with lumps, granules or powder particles that are not too fine to be examined as individual entities.

The above test results, which illustrate the relatively fast solution rate of our products, the uniform solution rate of each of the three constituent compounds, the non-segregating behavior of our products, and the constancy of reaction to alkalinity color indicators, lead to the conclusion that our compositions are composed of what in use performs like a solid solution of anhydrous trisodium phosphate, anhydrous tetrasodium pyrophosphate, and anhydrous sodium carbonate, and that even those discrete particles which are very small contain all three of those compounds intimately bonded together.

This is a continuation-in-part of our copending but now abandoned application, Serial No. 757,872, filed June 28, 1947, for "Water Softening and Detergent Compound and Process of Preparing the Same in Variable Proportions."

Having fully described our invention, it is to be understood that we do not wish to be limited to the details herein set forth, but our invention is of the full scope of the appended claims.

We claim:

1. A process of preparing a water softener and detergent by the simultaneous production of anhydrous trisodium phosphate, anhydrous tetrasodium pyrophosphate and anhydrous sodium carbonate, comprising the steps of heating at a temperature between 250° and 550° C. a mixture of phosphoric acid, sodium carbonate and water having an analytical ratio of $Na_2O:P_2O_5$ within the range of 2.0 to 5.1 for a sufficient length of time to produce a homogeneous white, friable and coarse product consisting of anhydrous trisodium phosphate, anhydrous tetrasodium pyrophosphate and anhydrous sodium carbonate in intimate mixture.

2. A water softener and detergent composition produced by the process of claim 1 comprising unfused discrete particles, each particle containing anhydrous trisodium phosphate, anhydrous tetrasodium pyrophosphate, any anhydrous sodium carbonate, each said particle being of substantially homogeneous composition throughout and having an $Na_2O.P_2O_5$ ratio within the range of 2.0 to 5.1.

3. A process of preparing a water softening and detergent composition which comprises the steps of preparing a water solution of phosphoric acid and sodium carbonate having an analytical ratio of $Na_2O:P_2O_5$ within the range of 2.0 to 5.1, calcining the solution at a temperature between 250° and 550° C. for a period of time between one and two hours to produce a white, friable, coarse and homogeneous non-fused product consisting of anhydrous trisodium phosphate, anhydrous tetrasodium pyrophosphate and anhydrous sodium carbonate in intimate mixture.

4. The process of preparing a water softening and detergent composition which comprises the steps of preparing a water solution of phosphoric acid and sodium carbonate having an analytical ratio of $Na_2O:P_2O_5$ within the range of 2.0 to 5.1, and calcining the solution at a temperature below the fusion temperature of the resultant product for approximately one to two hours to produce a white, friable, coarse and homogeneous mixture of anhydrous trisodium phosphate, anhydrous tetrasodium pyrophosphate, and anhydrous sodium carbonate.

5. A process of preparing a water softener and detergent composition which comprises the steps of calcining at a temperature below red heat a water solution of phosphoric acid and sodium carbonate having an analytical ratio of $Na_2O:P_2O_5$ within the range of 2.0 to 5.1 for a sufficient length of time to produce a homogeneous white friable and coarse product consisting of anhydrous trisodium phosphate, anhydrous tetrasodium pyrophosphate, and anhydrous sodium carbonate.

References Cited in the file of this patent

UNITED STATES PATENTS

| | | |
|---|---|---|
| 1,517,837 | Hehman | Dec. 2, 1924 |
| 2,427,642 | Aitchison | Sept. 16, 1947 |

FOREIGN PATENTS

| | | |
|---|---|---|
| 435,317 | Great Britain | Sept. 19, 1935 |